(12) United States Patent
Bedell et al.

(10) Patent No.: US 7,593,186 B2
(45) Date of Patent: Sep. 22, 2009

(54) P1 WRITE POLE WITH SHOULDER FORMATION

(75) Inventors: Daniel Wayne Bedell, Gilroy, CA (US);
Hung-Chin Guthrie, Saratoga, CA (US); Ming Jiang, San Jose, CA (US); Hieu Lam, Milpitas, CA (US); Jyh-Shuey Lo, San Jose, CA (US); Edward Hin Pong Lee, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 571 days.

(21) Appl. No.: 11/046,740

(22) Filed: Jan. 31, 2005

(65) Prior Publication Data
US 2006/0171069 A1    Aug. 3, 2006

(51) Int. Cl.
*G11B 5/39* (2006.01)
*G11B 5/147* (2006.01)
(52) U.S. Cl. ............................. 360/125.47; 360/125.52
(58) Field of Classification Search ................ 360/125, 360/126, 127, 125.46, 125.47, 125.48, 125.51, 360/125.52, 125.53; 29/603.07–603.19
See application file for complete search history.

(56) References Cited

U.S. PATENT DOCUMENTS

| | | | |
|---|---|---|---|
| 5,898,548 A | 4/1999 | Dill et al. .................... 360/113 |
| 6,487,056 B1 | 11/2002 | Gibbons et al. ........ 360/327.31 |
| 6,539,610 B1 | 4/2003 | Lo et al. ................... 29/603.07 |
| 6,556,377 B2 * | 4/2003 | Chen et al. ................... 360/126 |
| 6,680,832 B2 | 1/2004 | Fontana, Jr. et al. ...... 360/324.2 |
| 6,975,486 B2 * | 12/2005 | Chen et al. ............. 360/125.63 |
| 6,987,643 B1 * | 1/2006 | Seagle .................... 360/125.42 |
| 7,029,376 B1 * | 4/2006 | Guthrie et al. ................ 451/41 |
| 7,061,717 B2 * | 6/2006 | Takano ........................ 360/126 |
| 7,062,839 B2 * | 6/2006 | Sasaki et al. ............. 29/603.15 |
| 7,085,099 B2 * | 8/2006 | Sasaki et al. ................. 360/123 |
| 7,391,591 B2 * | 6/2008 | Hsiao et al. ............ 360/125.48 |
| 7,392,578 B2 * | 7/2008 | Sasaki et al. ............. 29/603.15 |
| 2001/0028531 A1 * | 10/2001 | Morita et al. ............... 360/126 |
| 2002/0015266 A1 * | 2/2002 | Han et al. .................... 360/317 |
| 2002/0159200 A1 * | 10/2002 | Ju et al. ....................... 360/318 |
| 2003/0035248 A1 * | 2/2003 | Daby et al. .................. 360/317 |
| 2003/0053251 A1 * | 3/2003 | Yoshida et al. .............. 360/126 |
| 2003/0112555 A1 * | 6/2003 | Sato et al. .................... 360/126 |
| 2003/0214763 A1 | 11/2003 | Childress et al. ......... 360/324.2 |
| 2003/0214765 A1 | 11/2003 | Ghaly et al. ........... 360/324.12 |
| 2004/0047085 A1 | 3/2004 | Liao et al. .............. 360/324.12 |
| 2004/0105192 A1 | 6/2004 | Chien et al. .............. 360/324.1 |
| 2004/0150912 A1 * | 8/2004 | Kawato et al. .............. 360/126 |
| 2004/0184190 A1 * | 9/2004 | Han et al. .................... 360/126 |
| 2004/0233577 A1 * | 11/2004 | Takano ........................ 360/125 |

(Continued)

*Primary Examiner*—Brian E Miller
(74) *Attorney, Agent, or Firm*—Patent Law Office of Larry Guernsey; Larry B. Guernsey

(57) ABSTRACT

A magnetic disk drive head is disclosed including a write head, which includes a P1 layer having a pedestal portion, a gap layer formed on the P1 layer, and a P2 layer formed on the gap layer. The P1 layer includes a shoulder formation having a neck portion and a beveled portion. Also disclosed is a disk drive having a write head with a P1 layer with shoulder formation, and a method for fabricating a write pole for a magnetic recording head having a P1 layer with shoulder formation.

12 Claims, 7 Drawing Sheets

U.S. PATENT DOCUMENTS

2005/0099727 A1* 5/2005 Dovek et al. .............. 360/126
2005/0190493 A1* 9/2005 Takano et al. ............. 360/126
2005/0264934 A1* 12/2005 Oike et al. ................ 360/126
2005/0270695 A1* 12/2005 Hsiao et al. ............... 360/126
2008/0158731 A1* 7/2008 Hsiao et al. ............ 360/125.48

* cited by examiner

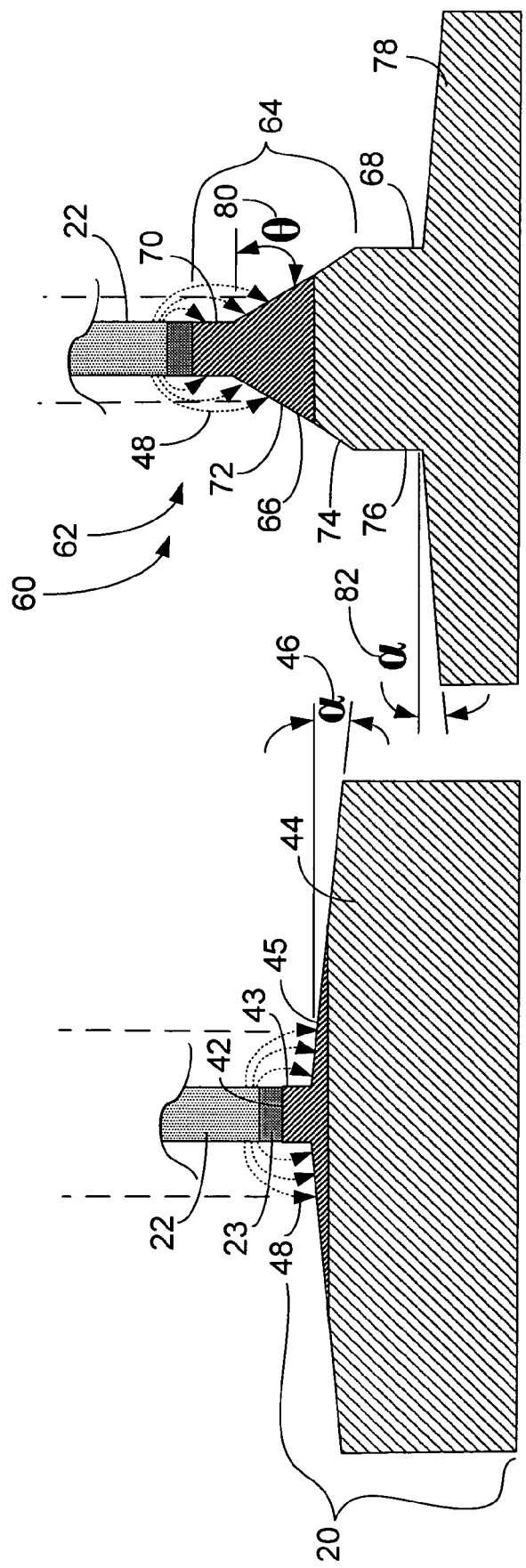

P1 WRITE POLE WITH SHOULDER FORMATION

BACKGROUND OF THE INVENTION

1. Field of the Invention

The present invention relates generally to manufacture of heads for data storage devices and more specifically to a write head for a hard disk drive.

2. Description of the Prior Art

As the areal density of storage media steadily increases and track widths become narrower and closer together, there is more and more chance of interference from adjacent tracks. This interference has become so common that the acronym "ATI" for Adjacent Track Interference has been coined. This interference naturally increases write and read errors and is therefore undesirable.

A typical read/write head 14 is shown in FIG. 4, which is a side cut-away view of the slider 16 shown in FIG. 3. The magnetic head 14 includes a coil 18, P1 pole 20, and a second pole P2 22 which is separated from P1 pole 20 by write gap 23. The P1 pole 20, second pole P2 22 and write gap 23 can be considered together to be included in the write head 26. Magnetic flux is induced when current is passed through the coil 18 and then passes through the tip of the P2 22 pole, across the gap 23, through the recording medium (not shown) and returns through the P1 pole 20 to complete the magnetic circuit. The magnetic flux thus acts to write data to the magnetic medium.

Magnetic flux flows in lines which are not straight, and thus tend to spread out slightly as they traverse the gap 23 separating the poles P1 20 and P2 22. The amount of "spread" produced depends on the shape and configuration of the poles P1 20 and P2 22. FIG. 5 (prior art) shows a typical write head of the prior art including poles P1 20 and P2 22 and gap 23. It is common practice that the P1 pole 20 actually be composed of 2 or more layers, which in the example shown are two layers, designated as N1 42 and N3 44. It is common practice that the N1 42 layer be configured to be approximately the width of the P2 pole 22 and gap 23, and the N1 42 layer having a straight portion 43 having a thickness of generally is approximately 2-4 times the thickness of the gap layer 23. For ease of viewing, there has been no attempt to make the relative thicknesses of the layers in proper proportion.

The N3 layer 44 is typically much wider than the N1 layer 42, and the N3 layer 44 is also typically slightly beveled to channel magnetic flux more easily. The bevel angle α 46 is shown in the figure and generally is in the range of 5-15 degrees.

The magnetic flux 48 is shown spreading out as it leaves the P2 pole 22 until it finally contacts the N3 layer 44 of the P1 pole 20. This spread establishes the ATI. It is evident that this ATI is much wider than the P2 pole 22, and thus undesirable.

The design of write heads in general is a balance between narrowing undesirably broad ATI and having poles broad enough to allow adequate magnetic flux flow so that there is good field strength to accomplish satisfactory write or overwrite of data. As track widths become narrower and narrower, this balance becomes ever more delicate.

Thus there is a need for a magnetic write head which has smaller magnetic flux spread, thus creating less ATI, while allowing good magnetic flux channeling for good write and overwrite of data.

SUMMARY OF THE INVENTION

A preferred embodiment of the present invention is a magnetic disk drive head including a write head, which includes a P1 layer having a pedestal portion, a gap layer formed on the P1 layer, and a P2 layer formed on the gap layer. The P1 layer includes a shoulder formation having a neck portion and a beveled portion. Also disclosed is a disk drive having a write head with a P1 layer with this shoulder formation, and a method for fabricating a write pole for a magnetic recording head having a P1 layer with this shoulder formation.

It is an advantage of the present invention that it produces less ATI, and thus produces fewer read/write errors.

It is another advantage of the present invention that it produces greater manufacturing yields due to lower errors rates.

It is a further advantage of the present invention that it produces good magnetic flux channeling, and thus fewer write or overwrite errors in very narrow channel widths.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIG. 5 shows front plan views of the magnetic flux patterns between P1 and P2 poles of a write head of the prior art;

FIG. 6 shows front plan views of the magnetic flux patterns between the P2 pole and P1 pole with shoulder formation of the present invention.

DETAILED DESCRIPTION OF THE PREFERRED EMBODIMENTS

Figure 1:
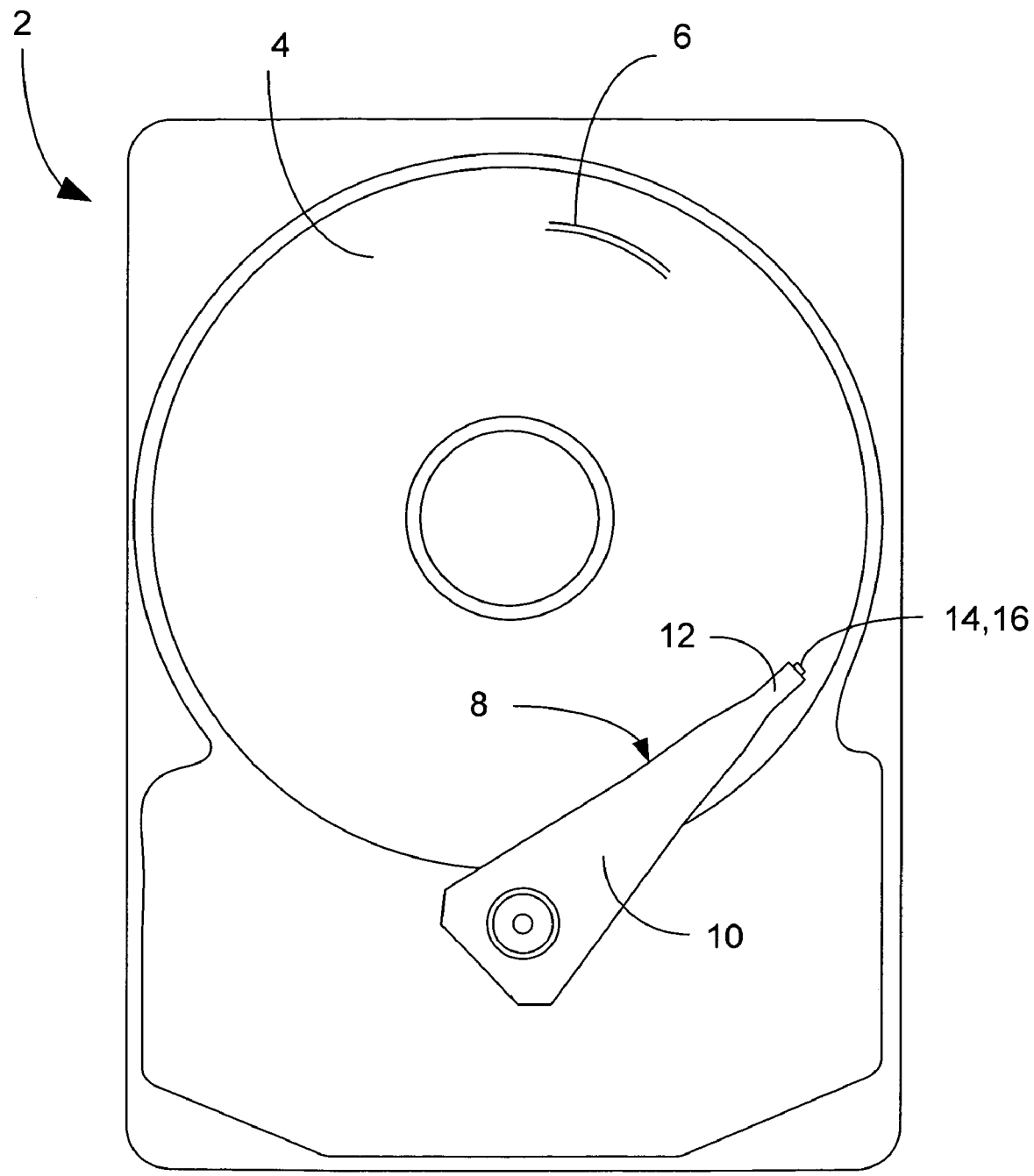
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
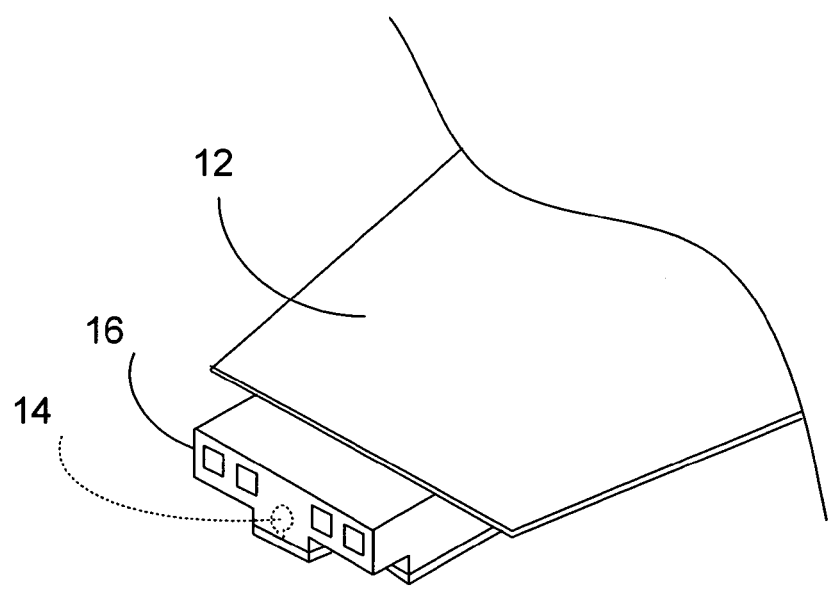
FIG. 2 illustrates a perspective view of view of an exemplary slider and suspension.
Figure 3:
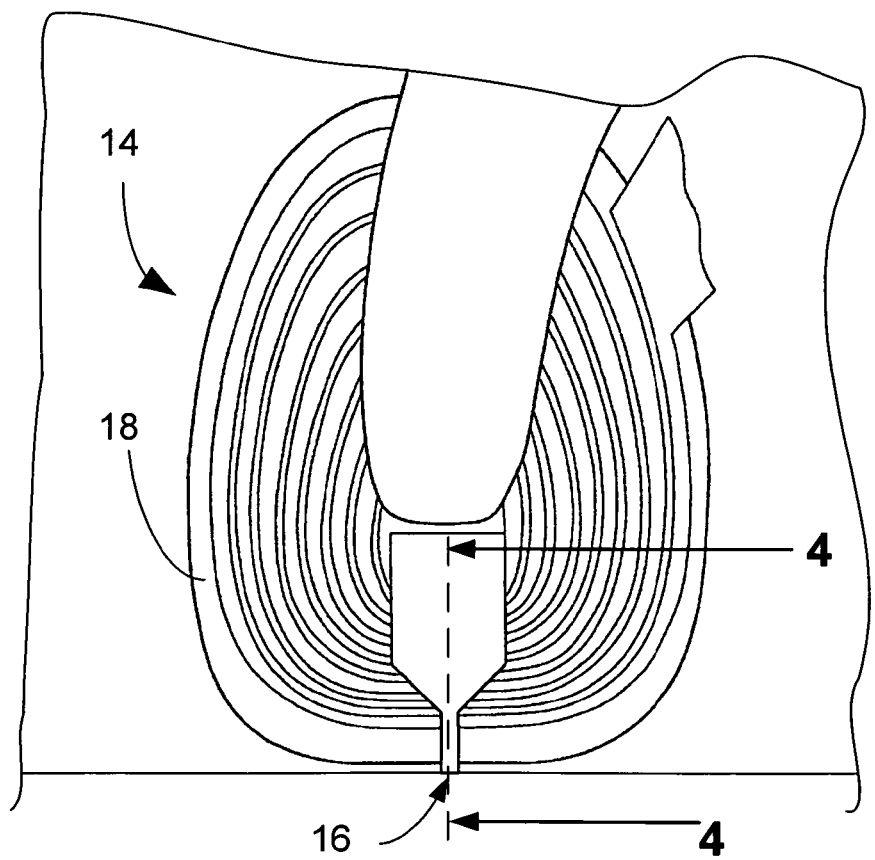
FIG. 3 shows a top plan view of an exemplary read/write head.
Figure 4:
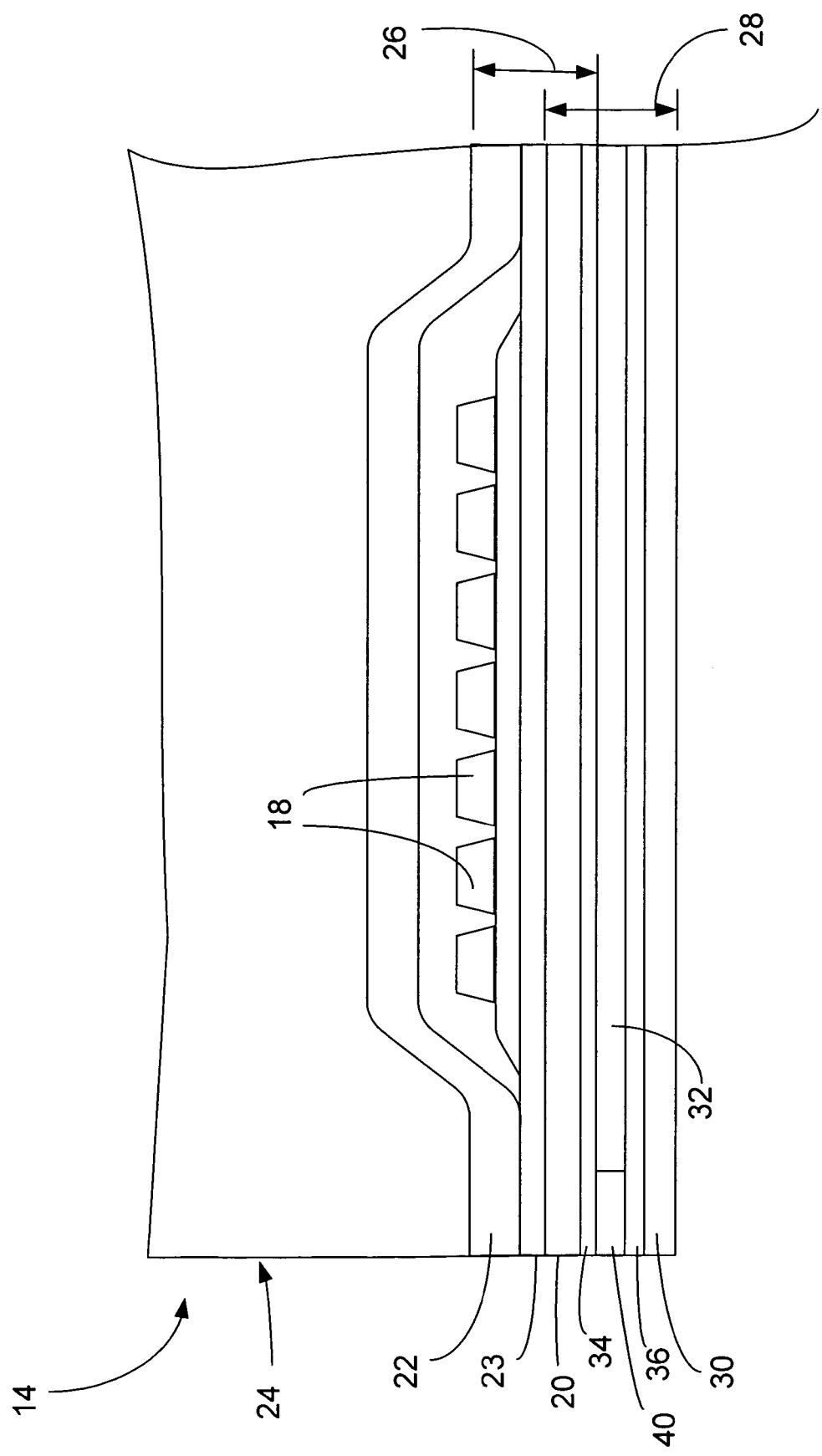
FIG. 4 is a cross-section view of an exemplary read/write head.

FIG. 2 shows a slider 16 in more detail being supported by suspension 12. The magnetic head 14 is shown in dashed lines, and in more detail in FIGS. 3 and 4. The magnetic head 14 includes a coil 18, P1 pole 20, and a second pole P2 22 which is separated from P1 pole 20 by write gap 23. The P1 pole 20, second pole P2 22 and write gap 23 can be considered together to be included in the write head 26.

A read sensor 40 is sandwiched between a first shield, designated as S1 30 and a second shield S2 34, and these elements together make up the read head 28. An insulation layer 32 also separates S1 30 and S2 34 in the area behind the read sensor 40. The magnetic head 14 flies on an air cushion between the surface of the disk 4 and the air bearing surface (ABS) 24 of the slider 16.

As discussed above, magnetic flux is induced when current is passed through the coil 18. The flux then passes through the tip of the P2 22 pole, across the gap 23, through the recording medium (not shown) and returns through the P1 pole 20 to complete the magnetic circuit. The magnetic flux thus acts to write data to the magnetic medium.

Magnetic flux flows in lines which are not straight, and thus tend to spread out slightly as they traverse the gap 23 separating the poles P1 20 and P2 22. The amount of "spread" produced depends on the shape and configuration of the poles P1 20 and P2 22.

The novelty of the present invention may be best understood when compared to the prior art, as discussed above. FIG. 5 (prior art) shows a typical write head of the prior art including poles P1 20 and P2 22 and gap 23. It is common practice that the P1 pole 20 actually be composed of 2 or more layers, which in the example shown are two layers, designated as N1 42 and N3 44. It is common practice that the N1 42 layer be configured to be approximately the width of the P2 pole 22 and gap 23. For ease of viewing, there has been no attempt to make the relative thicknesses of the layers in proper proportion.

The N3 layer 44 is typically much wider than the N1 layer 42, and the N3 layer 44 is also typically slightly beveled to channel magnetic flux more easily. The bevel angle α 46 is shown in the figure and generally is in the range of 5-15 degrees.

The N1 layer 42 is also typically shaped to have a straight portion 43 and a beveled portion 45. The thickness of the N1 Straight portion 43 is generally 2-4 times the thickness of the gap layer 23.

The magnetic flux 48 is shown spreading out as it leaves the P2 pole 22 until it finally contacts the N1 layer 42 or N3 layer 44 of the P1 pole 20. This spread establishes the ATI. It is evident that this ATI is much wider than the P2 pole 22, and thus.

Figure 13:
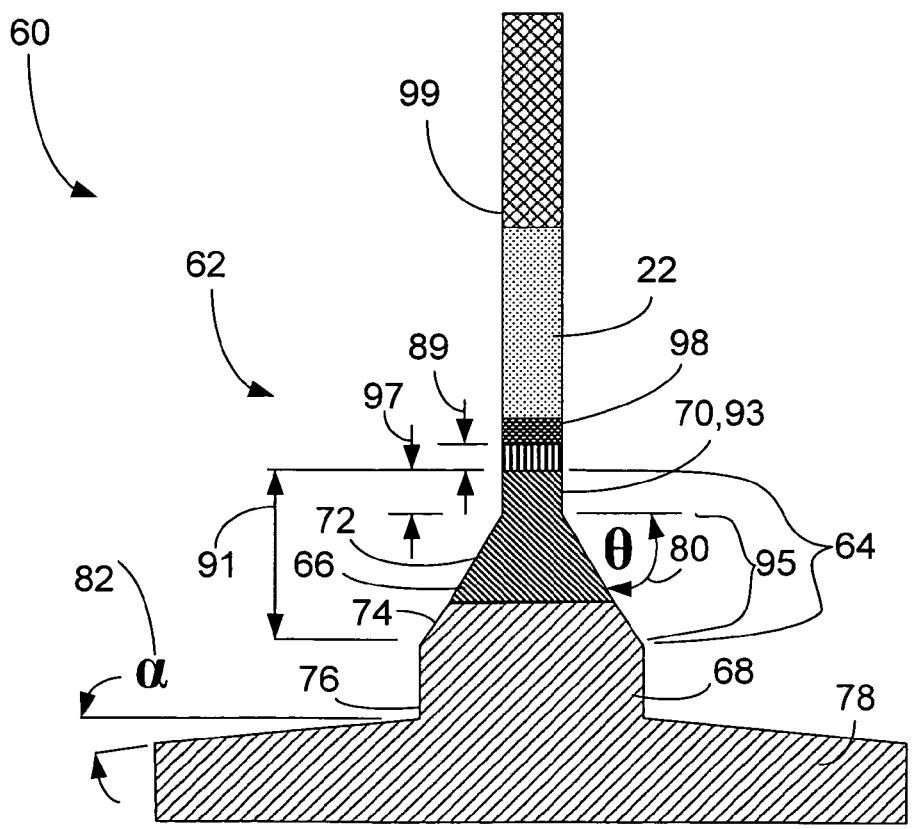

In contrast, the present write head 60 having a P1 pole with shoulder formation 62 of the present invention is shown completed in FIGS. 6 and 13. The shoulder formation 64 includes portions of both N1 layer 66 and N3 layer 68. The N1 layer 66 has been shaped to have a straight portion 70 and a beveled portion 72, and the N3 layer 68 also includes a beveled portion 74 and a straight portion 76, as well as an N3 main body 78. The N1 and N3 beveled portions 72, 74 are preferably, but not necessarily, formed with a common bevel angle θ 80 which is preferably in the range of 10-70 degrees. The N3 main body 78 has a bevel angle α 82 which is again preferably in the range of 5-15 degrees. The shoulder formation 64 thus includes N1 straight portion 70, N1 beveled portion 72, and N3 beveled portion 74. The N1 straight portion 70 is preferably 0.5-2.5 times the thickness of the gap layer 23. The entire shoulder formation 64 which includes the N1 straight portion 70, the N1 beveled portion 72, and N3 beveled portion 74, is preferably in the range of 2-5 times the thickness of the gap layer 23. This compares to the thickness of the straight portion 43 of the N1 layer 42 of the prior art, which is typically approximately 2-4 times the thickness of the gap layer 23.

As shown in FIG. 6, the increased distance together with the beveled geometry of the layers allows the magnetic flux lines 48 to create smaller spread as they leave the P2 pole 22 and they return to the P1 pole 62. The magnetic flux is much more confined in the present invention. This creates much less ATI, resulting in few errors, better production yields, and thus more efficient fabrication procedures. The geometry of the shoulder formation 64 also provides very good channeling of magnetic flux thus providing excellent write and overwrite of data.

The novel write head with shoulder formation 60 of the present invention also requires a novel method of fabrication to produce, which is shown in FIGS. 7-13, and which also introduces several optional variations in structure, which may be incorporated into the shoulder formation, as discussed below.

Figure 7:
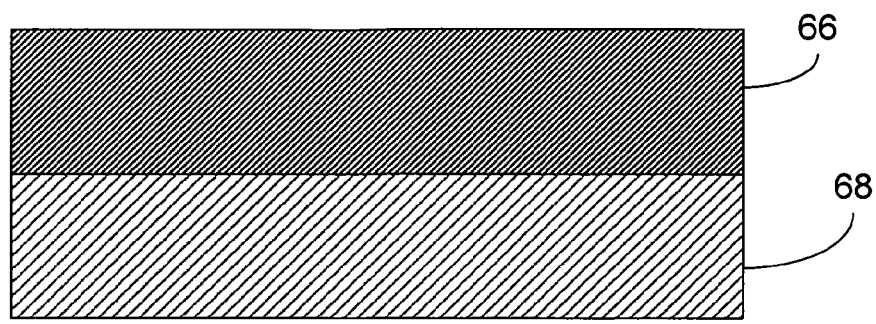
FIGS. 7-13 show front plan views of various stages in the fabrication of the write head of the present invention.

FIG. 7 shows an N1 layer 66, preferably made of material chosen from a group consisting of CoFe, NiFe, CoFeNi, CoFeN, etc. which has been deposited on an N3 layer 68 preferably made of material chosen from a group consisting of CoFe, NiFe, CoFeNi, etc.

Figure 8:
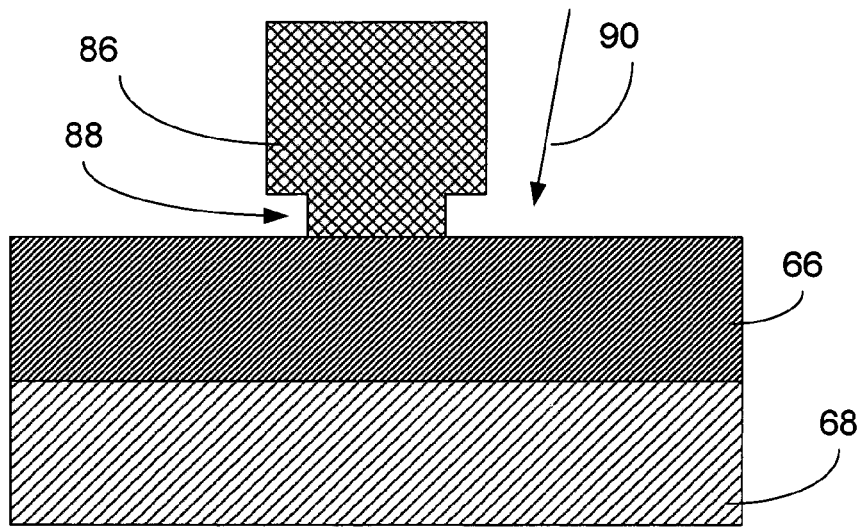

FIG. 8 shows a masking layer 86, preferably made of photomask material, which has been formed on the N1 layer 66. The masking layer 86 preferably includes undercut regions 88, and protects a portion of the N1 layer 66 from milling by an ion milling source 90.

Figure 9:
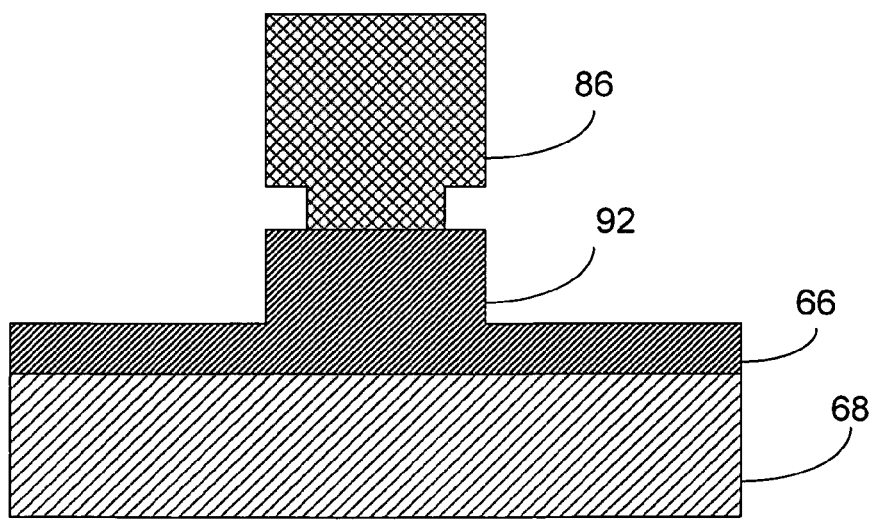

As FIG. 9 shows, the ion milling and masking operation has been used to form an N1 pedestal portion 92, which has been shielded by the masking layer 86 from the ion milling beam.

Figure 10:
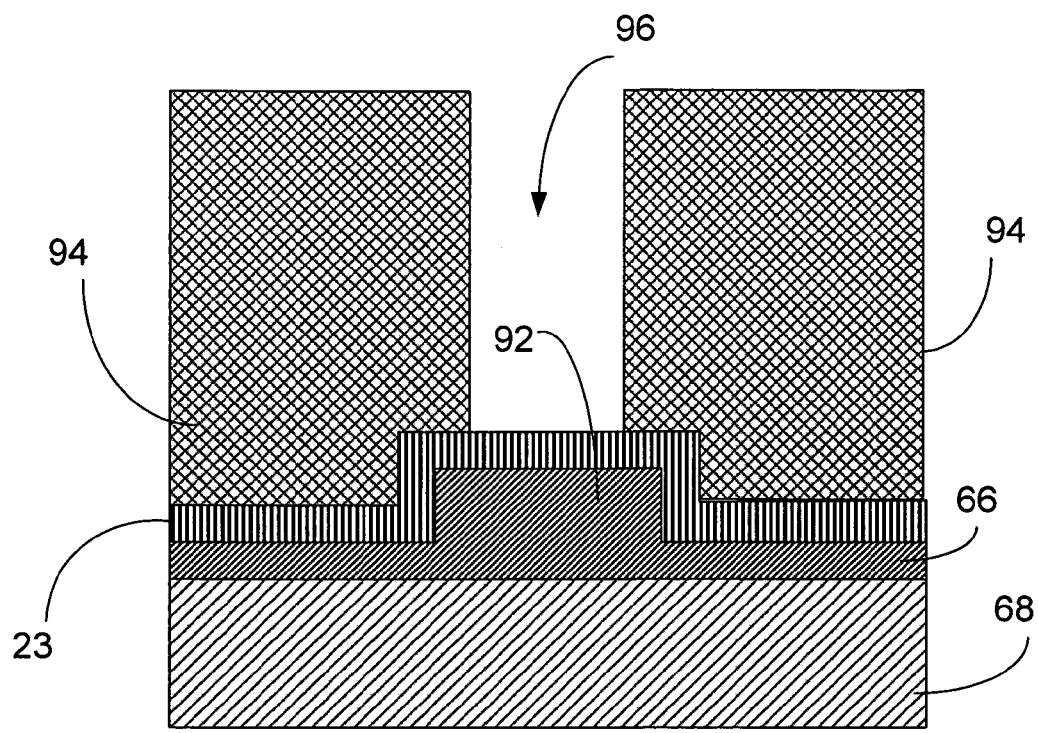

FIG. 10 shows that the masking layer (not shown) has been removed, the gap layer 23 has been deposited on the N1 layer 66 including the N1 pedestal portion 92. Photoresist plating masks 94 have been formed, surrounding a slot 96, which defines the initial P2 track. The slot 96 is carefully aligned with the N1 pedestal portion 92, although separated from it by the gap layer 23. The gap layer 23 is formed of Rh, Pt, Au, or Pd serving as the seed layer for electroplating.

Figure 11:
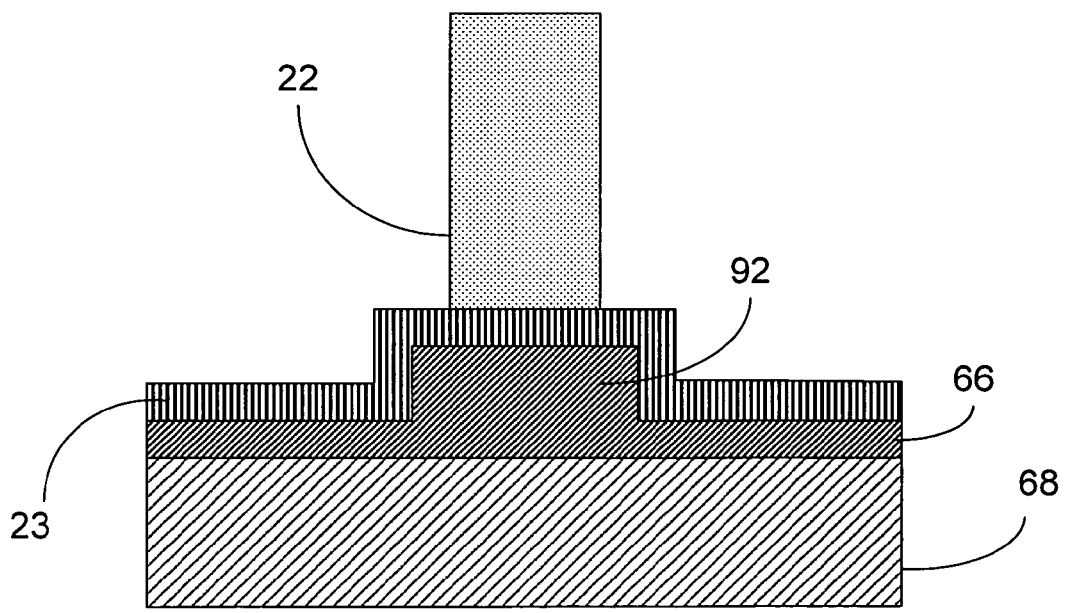

FIG. 11 shows that the slot 96 of FIG. 10 has been plated with material which is preferably chosen from a group consisting of CoFe, NiFe, CoFeNi, etc and which will form the P2 pole 22.

Figure 12:
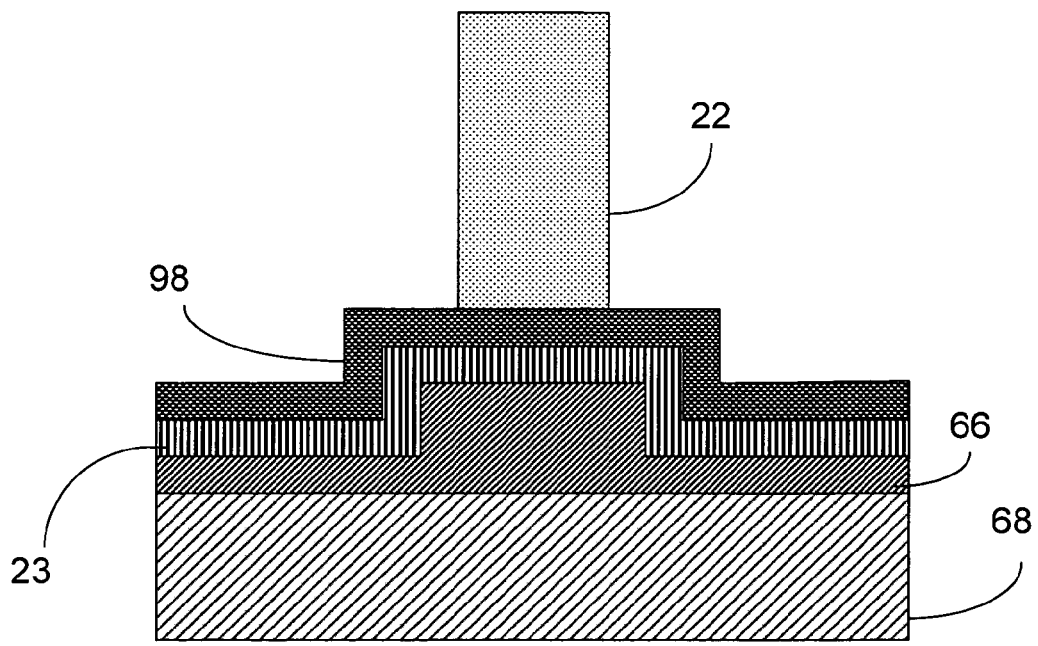

As an optional variation on this, FIG. 12 shows that an additional seed layer 98 has been deposited on the gap layer 23, and the P2 pole 22 material has been plated on top of this seed layer 98. This seed layer 98 can be included in the final shoulder formation, but is an optional variation.

In FIG. 13, the write head 60 has been shaped to its final configuration, preferably by ion milling. The final width of the P2 pole 22 has been established, and the N1 layer 66 has been shaped to have a straight portion 70 and a beveled portion 72, and the N3 layer 68 also includes a beveled portion 74 and a straight portion 76, as well as an N3 main body 78, as discussed above. The N1 and N3 beveled portions 72, 74 are preferably, but not necessarily, formed with a common bevel angle θ 80 which is preferably in the range of 10-70 degrees. The N3 main body 78 has a bevel angle α 82 which is preferably in the range of 5-15 degrees. The shoulder formation 64 thus includes N1 straight portion 70, N1 beveled portion 72, and N3 beveled portion 74. For purposes of this discussion, the shoulder formation 64 will be considered to have a neck portion 93, which is the straight portion above the beveled portions 72, 74, and which generally corresponds to the N1 straight portion 70. The shoulder formation 64 will also be considered to have a beveled portion 95, which generally includes the N1 beveled portion 72 and the N3 beveled portion 74, which preferably has the common bevel angle θ 80, discussed above.

The neck portion 93 has a thickness 97, which is preferably 0.5-2.5 times the thickness 89 of the gap layer 23. The entire shoulder formation 64 which includes the neck portion 93, and the beveled portion 95, has a shoulder thickness 91 which is preferably in the range of 2-5 times the thickness 89 of the gap layer 23. This may be compared to the thickness of the straight portion 43 of the N1 layer 42 of the prior art (see FIG. 5), which is typically approximately 2-4 times the thickness 89 of the gap layer 23.

An optional seed layer 98 is shown, and also, as a second optional variation, a P2 second layer 99 as it is also possible that the P2 pole be a bi-layer structure. It is also possible that the P2 be more than two layers, although this is not shown in the figure.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic disk drive head including a write head, comprising:
    a P1 layer which includes an N1 layer and an N3 layer, where said N1 layer has a neck portion and a beveled portion, and said N3 layer has a beveled portion, a straight portion and a main body;
    a gap layer having a gap thickness, formed on said P1 layer; and
    a P2 layer formed on said gap layer;
    wherein said P1 layer includes a shoulder formation which includes said N1 layer neck portion and said N1 layer beveled portion, and said N3 layer beveled portion.

2. The magnetic disk drive head of claim 1, wherein:
    said beveled portions of said N1 layer and said N3 layer have has a bevel angle in the range of 10-70 degrees.

3. The magnetic disk drive head of claim 1, wherein:
    said neck portion has a thickness of 0.5-2.5 times said gap thickness.

4. The magnetic disk drive head of claim 1, wherein:
    said shoulder formation has a thickness of 2-5 times said gap thickness.

5. The magnetic disk drive head of claim 1, wherein:
    said main body of said N3 layer has a bevel angle, which is in the range of 5-15 degrees.

6. The magnetic disk drive head of claim 1, further comprising:
    a seed layer formed on said gap layer.

7. A disk drive comprising:
    at least one hard disk;
    at least one magnetic head adapted to fly over said hard disk for writing data to said hard disk, said magnetic head including a magnetic write head including:
    a P1 layer which includes an N1 layer and an N3 layer, where said N1 layer has a neck portion and a beveled portion, and said N3 layer has a beveled portion, a straight portion and a main body;
    a gap layer having a gap thickness, formed on said P1 layer; and
    a P2 layer formed on said gap layer;
    wherein said P1 layer includes a shoulder formation which includes said N1 layer neck portion and said N1 layer beveled portion, and said N3 layer beveled portion.

8. The disk drive of claim 7, wherein:
    said beveled portions of said N1 layer and said N3 layer have has a bevel angle in the range of 10-70 degrees.

9. The disk drive of claim 7, wherein:
    said neck portion has a thickness of 0.5-2.5 times said gap thickness.

10. The disk drive of claim 7, wherein:
    said shoulder formation has a thickness of 2-5 times said gap thickness.

11. The disk drive of claim 7, wherein:
    said main body of said N3 layer has a bevel angle, which is in the range of 5-15 degrees.

12. The disk drive of claim 7, further comprising:
    a seed layer formed on said gap layer.

* * * * *

UNITED STATES PATENT AND TRADEMARK OFFICE
CERTIFICATE OF CORRECTION

PATENT NO. : 7,593,186 B2  Page 1 of 1
APPLICATION NO. : 11/046740
DATED : January 31, 2005
INVENTOR(S) : Bedell et al.

It is certified that error appears in the above-identified patent and that said Letters Patent is hereby corrected as shown below:

Column 5:
In claim 2, line 3, please delete the word "has".

Column 6:
In claim 8, line 8, please delete the word "has".

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,593,186 B2  
APPLICATION NO. : 11/046740  
DATED : January 31, 2005  
INVENTOR(S) : Bedell et al.

Page 1 of 1

It is certified that error appears in the above-identified patent and that said Letters Patent is hereby corrected as shown below:

Column 5:  
In claim 2, line 36, please delete the word "has".

Column 6:  
In claim 8, line 27, please delete the word "has".

This certificate supersedes the Certificate of Correction issued November 10, 2009.

Signed and Sealed this

First Day of December, 2009

David J. Kappos  
*Director of the United States Patent and Trademark Office*